United States Patent [19]

Nakamichi

[11] 4,052,745
[45] Oct. 4, 1977

[54] MAGNETIC HEAD ADJUSTMENT MEANS FOR A MAGNETIC TAPE MACHINE

[75] Inventor: Niro Nakamichi, Kodaira, Japan

[73] Assignee: Nakamichi Research Inc., Kodaira, Japan

[21] Appl. No.: 679,027

[22] Filed: Apr. 21, 1976

[30] Foreign Application Priority Data

Apr. 26, 1975 Japan .............................. 50-57119[U]
May 1, 1975 Japan .............................. 50-59328[U]

[51] Int. Cl.² ........................................... G11B 21/24
[52] U.S. Cl. .................................................... 360/109
[58] Field of Search ........................................ 360/109

[56] References Cited

U.S. PATENT DOCUMENTS

| 3,502,820 | 3/1970 | Zenz ..................................... 360/109 |
| 3,900,888 | 8/1975 | Uchikoshi et al. ................... 360/109 |
| 3,943,569 | 3/1976 | Bettini et al. ........................ 360/109 |

Primary Examiner—Robert S. Tupper
Attorney, Agent, or Firm—Woodling, Krost, Granger & Rust

[57] ABSTRACT

Magnetic head adjustment means for a magnetic tape machine, comprising a magnetic head mounting plate on which a magnetic head is securely mounted, said magnetic head mounting plate being pivotally movable about contact means to slidably extend through a base plate and engage said magnetic head mounting plate in a plane in which a head gap is contained. Depression means is provided to depress said contact means whereby said magnetic head is adjusted in its vertical position. Vertical position adjusting screw means adjusts the depression of said depression means. Inclination adjusting means is also provided to engage and pivotally move said magnetic head mounting plate whereby said magnetic head is adjusted in its inclination in a magnetic tape running plane.

9 Claims, 6 Drawing Figures

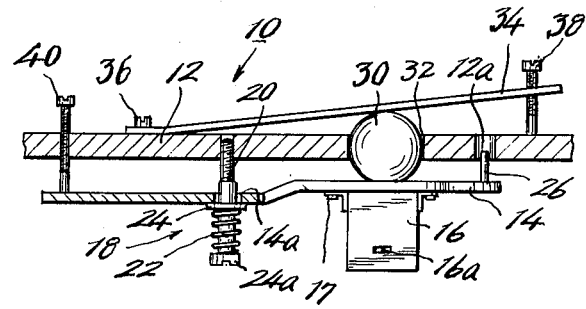
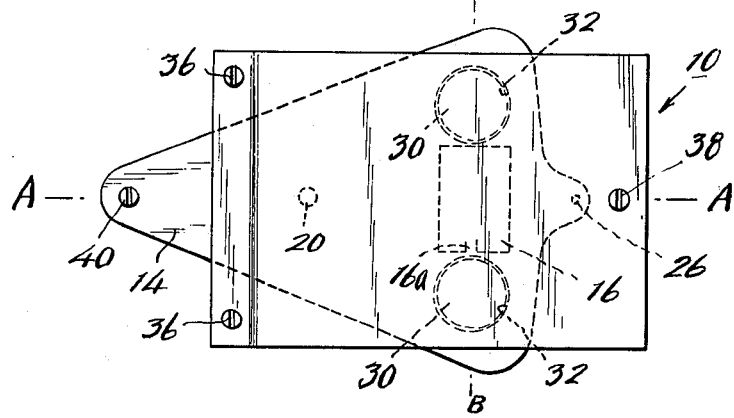
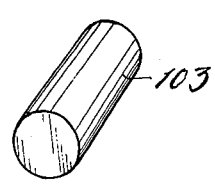
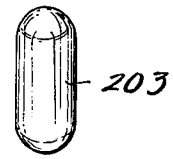
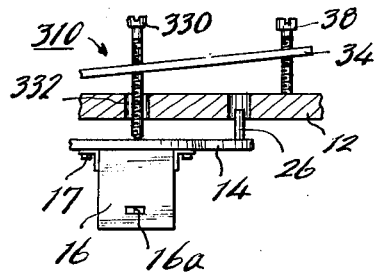
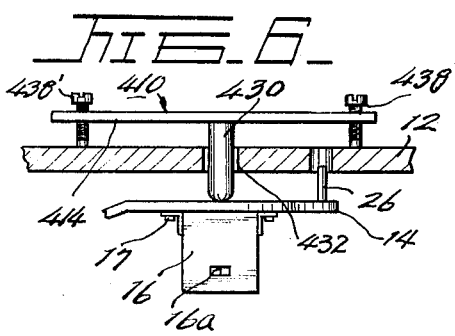

MAGNETIC HEAD ADJUSTMENT MEANS FOR A MAGNETIC TAPE MACHINE

BACKGROUND OF THE INVENTION

In general, in order to properly position a magnetic head of a magnetic tape machine relative to signal tracks on a magnetic tape, an inclination of a gap of the magnetic head in a plane in which the magnetic tape moves, as well as a vertical position of the head gap are required to be properly adjusted.

Conventionally, various proposals have been made to adjust the inclination and the vertical position of the head gap by various means, but it is inevitable that one of the adjustments of the inclination and the vertical position adversely affects the other adjustment; the adjustment of the vertical position of the head gap causes the head gap to vary in its inclination, while the adjustment of the inclination of the head gap causes the head gap to vary in its vertical position. Thus, the magnetic head is properly positioned with respect to both the adjustments in a troublesome manner and also in a skilled manner.

In particular, the magnetic tape has tracks finely divided so that the distance between the adjacent tracks is smaller and also the number of the magnetic heads used as in a three head tape machine becomes increased. As a result, the property of the tape tends to be more deteriorated due to failure to adjust the position of the magnetic heads.

SUMMARY OF THE INVENTION

Accordingly, it is a principal object of the present invention to provide magnetic head adjustment means for a magnetic tape machine adapted to properly position a magnetic head relative to a magnetic tape in an easier manner and with a simple construction.

It is another object of the present invention to provide magnetic head adjustment means for a magnetic tape machine adapted to prevent one of both adjustments of an inclination of the head gap and of a vertical position thereof from adversely affecting the other adjustment.

In accordance with the present invention, there is provided magnetic head adjustment means for a magnetic tape machine, comprising a base plate having a magnetic head disposed on one side thereof; a magnetic head mounting plate on which said magnetic head is securely mounted adjacent to one end thereof; support means provided adjacent to a middle portion of said magnetic head mounting plate to support said magnetic head mounting plate so as to permit a head gap of said magnetic head to incline in a magnetic tape running plane and so as to urge said magnetic head mounting plate to move toward said base plate; contact means to slidably extend through said base plate and to engage said magnetic head mounting plate in a plane in which the head gap is contained and which is perpendicular to the magnetic tape running plane so as to form the contact point or line about which said magnetic head mounting plate pivotally moves; depression means disposed on the other side of said base plate to depress said contact means whereby said magnetic head is adjusted in a vertical position while said magnetic head mounting plate is maintained parallel to said base plate in the direction perpendicular to the magnetic tape running plane; vertical position adjusting screw means threadedly extending through said depression means to adjust the depression of said depression means whereby said magnetic head is properly positioned in its vertical position; and inclination adjusting screw means threadedly extending through said base plate to engage said magnetic head mounting plate at the other end and to pivotally move said magnetic head mounting plate whereby said magnetic head is properly positioned in its inclination in said magnetic tape running plane.

BRIEF DESCRIPTION OF THE DRAWING

The above and other objects and features of the present invention will be apparent from the description of preferred embodiments taken with reference to the accompanying drawing wherein;

FIG. 1 is a vertically sectional view of an embodiment of magnetic head adjustment means for a magnetic tape machine;

FIG. 2 is a top view of the magnetic head adjustment means of FIG. 1 with a base plate shown to be omitted;

FIGS. 3 and 4 perspectively shown modified contact elements of the magnetic head adjustment means of FIGS. 1 and 2;

FIG. 5 is a fragmentary and vertically sectional view of a modification of the magnetic head adjustment means of FIGS. 1 and 2; and FIG. 6 is similar to FIG. 5, but shows another embodiment of the magnetic head adjustment means.

DETAILED DESCRIPTION OF PREFERRED EMBODIMENTS

Referring now to FIG. 1 of the drawing, ther is shown magnetic head adjustment means 10 which comprises a base plate 12 which constitutes a portion of a chassis of a magnetic tape machine. A magnetic head mounting plate 14 is disposed inside of the base plate 12 and securely mounts a magnetic head 16 adjacent to a righthanded end of the plate 14 as viewed in FIG. 1, by any suitable means such as screws 17. In FIG. 1, numeral 16a designates a gap of the magnetic head 16. A magnetic tape not shown runs along the surface of the magnetic head 16 wherein the head gap 16a is located.

Support means 18 to support the magnetic head mounting plate 14 may comprise a screw 20 which extends through a hole 14a provided in the plate 14 adjacent to a middle portion thereof, and which also threadedly extends through a threaded hole in the base plate 12. A coil spring 22 may be provided around the screw 20 and between the head 20a of the screw 20 and a washer 24 on the magnetic head mounting plate 14 and serves to urge the magnetic head mounting plate 14 to move toward the base plate 12. The support means 18 may also comprise a vertical pin 26 secured to the magnetic head mounting plate 14 at the righthanded end. The vertical pin 26 is slidably inserted into a hole 12a in the base plate 12 so that the magnetic head mounting plate 14 is restrained from its movement in a horizontal plane. It should be noted that the screw 20 and the vertical pin 26 are disposed on a line A—A which constitutes a symmetrical line of the magnetic head mounting plate 14. Thus, it will be appreciated that the magnetic head mounting plate 14 can vertically move, but that it cannot move in a horizontal plane.

Magnetic head adjustment means 10 also comprises contact elements 30 to slidably extend through respective holes 32 in the base plate 12 and to engage the magnetic head mounting plate 14. In the illustrated embodiment, the contact elements 30 may be in the form of ball. It should be noted that contact points where the ball-like contact elements 30 contact with the magnetic head mounting plate 14 align with each other in the plane in which the head gap is contained and which is perpendicular to the magnetic tape running plane, as shown in a line B—B of FIG. 2. The magnetic head adjustment means 10 may also comprise an adjustable depression member 34 which, in the illustrated embodiment, may be in the form of a leaf spring having an elasticity higher than that of the coil spring 22. The depression member 34 is disposed outside of the base plate 12, with one end of the depression member 34 being securely mounted on the base plate 12 by screws 36 and with the other end of the depression member 34 having a vertical position adjusting screw 38 threadedly extending therethrough and engaging the base plate 12, the contact elements 30 being held between the magnetic head mounting plate 14 and the depression member 34. Thus, when the depression member 34 is depressed about the screws 36 by the vertical adjusting screw 38, then the contact elements 30 moves down through the base plate 12 so as to lower the magnetic head mounting plate 14 while the latter is maintained parallel to the base plate 12 along the line B—B of FIG. 2. Reversely, when the depression member 34 is raised by the adjusting screw 38, then the magnetic head mounting plate 14 also moves upward through the contact elements 30 while it is maintained parallel to the base plate 12 along the line B—B of FIG. 2. Thus, by adjustment of the screw 38, the magnetic head 16 is adjusted in its vertical position. It will be appreciated that the contact elements 30 should have the same outside diameter and should have no substantial play relative to the wall of the holes 32 in the base plate 12.

An inclination adjusting screw 40 is provided which threadedly extends through the base plate 12 and engages the magnetic head mounting plate 14 adjacent to the lefthanded end, as viewed in FIG. 1. Thus, when the screw 40 rotates, the magnetic head mounting plate 14 pivotally moves with the contact points of the mounting plate 14 with the ball-like contact elements 30 being as fulcrum, either against or on the action of the coil spring 22, so that the head gap 16a of the magnetic head 16 is properly positioned with respect to its inclination in the magnetic tape running plane. Of course, it will be noted that the magnetic head 16 is maintained parallel to the plane of the base plate 12 along the line B—B of FIG. 2 and that it is prevented from its movement in a horizontal plane by means of engagement of the vertical pin 26 with the wall of hole 12a in the base plate 12. Thus, it will be also noted that when the inclination of the head gap 16a is adjusted by means of screw 40, the vertical position of the head gap 16a, which is already adjusted in a proper manner, is never displaced out of the proper position.

FIGS. 3 and 4 show alternative contact element of the magnetic head adjustment means 10. A single contact element 103 of FIG. 3 may be in the form of a cylinder having the axis arranged in a plane of the base plate 12, with the lower curved surface engaging the magnetic head mounting plate 14 so as to form the contact line about which the magnetic head mounting plate 14 pivotally moves, and with the upper curved surface engaging the depression member 34. A contact element 203 of FIG. 4 may be in the form of a vertically disposed cylinder with the upper and lower ends being hemispheric. The contact element of FIG. 4 together with another similar contact element may be used in a similar manner to that of FIGS. 1 and 2.

FIG. 5 shows alternative magnetic head adjustment means 310 which may comprise contact elements 330 in the form of screw threadedly extending through the depression member 34 of leaf spring and further extending through respective holes 332 in the base plate 12 to engage the magnetic head mounting plate 14 as along the line B—B of FIG. 2. It will be noted that the pointed ends of the screw-like contact elements 330 cause the magnetic head to be more accurately adjusted in its inclination in the tape running plane. It will be also noted that the two screw-like contact elements 330 can position the magnetic head 16 precisely in its inclination against the magnetic tape running plane by adjusting the amount of protrusion from the lower surface of the base plate 12.

FIG. 6 shows an alternative magnetic head adjustment means 410 for the present invention. The vertical adjustment means may comprise two contact elements 430 in the form of pin having a hemispheric lower end which extend through respective holes 432 in the base plate 12 and engage the magnetic head mounting plate 14, and a rigid or non-resilient plate-like depression member 414 to which the pin-like contact elements 430 may be secured. The depression member 414 at both ends may have adjustable screws 438 and 438' threadedly extending therethrough and rotatably supported by the base plate on the upper surface thereof. The same numerals designate the same components to those of the afore-mentioned embodiments.

While some preferred embodiments of the present invention have been described with reference to the accompanying drawing, it will be understood that they are by way of example and that various changes and modifications may be made without departing from the spirit and scope of the invention, which is intended to be defined only to the appended claims.

What is claimed is:

1. Magnetic head adjustment means for a magnetic tape machine, comprising a base plate a magnetic head mounting plate on which a magnetic head is securely mounted adjacent to one end thereof; support means provided adjacent to a middle portion of said magnetic head mounting plate to movably attach said magnetic head mounting plate to said base plate to permit a head gap of said magnetic head to incline in a magnetic tape running plane and so as to resiliently urge said magnetic head mounting plate toward said base plate; contact means to slidably extend through said base plate and to engage said magnetic head mounting plate as a fulcrum in the plane in which the head gap is contained and at two points of said magnetic head mounting plate spaced to each other along the direction perpendicular to said tape running plate so that the gap containing surface of said magnetic head is maintained parallel to said tape running plane whereby said magnetic head mounting plate is maintained substantially parallel to the direction perpendicular to said tape running plane as said magnetic head mounting plate pivotally moves about said fulcrum; depression means disposed on the other side of said base plate to depress said contact means against the urging force of said support means whereby said magnetic head is adjusted in a vertical manner while said magnetic head is maintained parallel to said base plate in the direction perpendicular to the tape running plane; vertical position adjusting screw means threadedly extending through said depression means to adjust the depression of said depression means whereby said magnetic head is properly positioned in its vertical position;

and inclination adjusting screw means threadedly extending through said base plate to engage said magnetic head mounting plate at the other end and to pivotally move said magnetic head mounting plate about said fulcrum against the urging force of said support means whereby said magnetic head is properly positioned in its inclination in said magnetic tape running plane.

2. Magnetic head adjustment means as set forth in claim 1, wherein said support means comprises a screw which extends through said magnetic head mounting plate and is threaded into said base plate, and a coil spring provided around said screw and between the head of said screw and said magnetic head mounting plate.

3. Magnetic head adjustment means as set forth in claim 2, wherein said support means further comprises a vertical pin securely mounted on said magnetic head mounting plate and inserted into a hole in said base plate.

4. Magnetic head adjustment means as set forth in claim 1, wherein said contact means comprises two balls held between said magnetic head mounting plate and said depression means.

5. Magnetic head adjustment means as set forth in claim 1, wherein said contact means comprises two cylinders having upper and lower ends pointed and engaging said depression means and said magnetic head mounting plate, respectively.

6. Magnetic head adjustment means as set forth in claim 1, wherein said contact means comprises two screws threadedly extending through said depression means and engaging said magnetic head mounting plate.

7. Magnetic head adjustment means as set forth in claim 1, wherein said depression means comprises a leaf spring with one end secured to said base plate and with the other end having said vertical position adjusting screw means threadedly extending therethrough.

8. Magnetic head adjustment means as set forth in claim 1, wherein said depression means comprises a rigid plate disposed parallel to said base plate and said contact means comprises a plurality of pins secured to said rigid plate, and said vertical position adjusting screw means comprising screws threadedly extending through said rigid plate at both ends, respectively and rotatably supported by said base plate.

9. Magnetic head adjustment means for a magnetic tape machine, comprising a base plate a magnetic head mounting plate on which a magnetic head is securely mounted adjacent to one end thereof; support means provided adjacent to a middle portion of said magnetic head mounting plate to movably attach said magnetic head mounting plate to said base plate to permit a head gap of said magnetic head to incline in a magnetic tape running plane and so as to resiliently urge said magnetic head mounting plate toward said base plate; contact means to slidably extend through said base plate and to engage said magnetic head mounting plate as a fulcrum in a plane in which the head gap is contained along the direction perpendicular to said tape running plane so that the gap containing surface of said magnetic head is maintained parallel to said tape running plane whereby said magnetic head mounting plate is maintained substantially parallel to the direction perpendicular to said tape running plane as said magnetic head mounting plate pivotally moves about said fulcrum, said contact means comprising a single cylinder having its axis arranged in said plane in which the head gap is contained; depression means disposed on the other side of said base plate to depress said contact means against the urging force of said support means whereby said magnetic head is adjusted in a vertical manner while said magnetic head is maintained parallel to said base plate in the direction perpendicular to the tape running plane; vertical position adjusting screw means threadedly extending through said depression means to adjust the depression of said depression means whereby said magnetic head is properly positioned in its vertical position; and inclination adjusting screw means threadedly extending through said base plate to engage said magnetic head mounting plate at the other end and to pivotally move said magnetic head mounting plate about said fulcrum against the urging force of said support means whereby said magnetic head is properly positioned in its inclination in said magnetic tape running plane.

* * * * *